United States Patent
Tseng et al.

(10) Patent No.: US 10,083,529 B2
(45) Date of Patent: Sep. 25, 2018

(54) REDUCTION METHOD FOR BOUNDARY ARTIFACT ON THE TOMOSYNTHESIS

(71) Applicant: Institute of Nuclear Energy Research, Atomic Energy Council, Executive Yuan, R.O.C., Taoyuan (TW)

(72) Inventors: Fan-Pin Tseng, Taipei (TW); Chia-Yu Lin, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 0 days.

(21) Appl. No.: 15/618,432

(22) Filed: Jun. 9, 2017

(65) Prior Publication Data
US 2018/0182134 A1    Jun. 28, 2018

(30) Foreign Application Priority Data
Dec. 23, 2016 (TW) .............................. 105143035 A

(51) Int. Cl.
*G06K 9/00* (2006.01)
*G06T 11/00* (2006.01)

(52) U.S. Cl.
CPC .......... *G06T 11/008* (2013.01); *G06T 11/006* (2013.01); *G06T 2207/10112* (2013.01); *G06T 2207/10141* (2013.01)

(58) Field of Classification Search
None
See application file for complete search history.

(56) References Cited

U.S. PATENT DOCUMENTS 9,911,208 B2 *    3/2018   Zhou ............... G06T 11/008
2017/0294034 A1*  10/2017  Zhou ............... G06T 11/008

* cited by examiner

*Primary Examiner* — Atiba O Fitzpatrick
(74) *Attorney, Agent, or Firm* — Locke Lord LLP; Tim Tingkang Xia, Esq.

(57) ABSTRACT

A reduction method for a boundary artifact on the tomosynthesis includes steps of performing a projection process, performing a back projection process upon the geometric factor matrix so as to obtain a back-projection geometric factor matrix, and adjusting a boundary area of the back-projection geometric factor matrix.

9 Claims, 13 Drawing Sheets

REDUCTION METHOD FOR BOUNDARY ARTIFACT ON THE TOMOSYNTHESIS

CROSS REFERENCE TO RELATED APPLICATION

The present application is based on, and claims priority from, Taiwan (International) Application Serial Number 105143035, filed on Dec. 23, 2016, the disclosure of which is hereby incorporated by reference herein in its entirety.

TECHNICAL FIELD

The present disclosure relates to an imaging method, and more particularly to a reduction method for a boundary artifact on the tomosynthesis that is applied to the field of radiological medicine.

BACKGROUND

Conventionally, the computed radiography (CR) can only be processed in a manner of batch operation. For example, a batch operation can process 60 x-ray films per hour. Though the batch operation might reduce cost, yet a necessary step of scanning the x-ray films through a CR reader to generate corresponding digital signals before the batch images can be processed in a computer system is cumbersome. Recently, a new technology (Digital radiography, DR) has been introduced to obtain digitized images directly by waiving the scanning process of the CR reader. Certainly, this DR technique has been the mainstream of the x-ray imaging equipment. In particular, a novel digital x-ray tomosynthesis that is capable of synthesizing multi-angle x-ray images into a three-dimensional image has substantially resolved the realization defects upon the disease or specific tissue on a conventional digital x-ray image. Further, for imaging by this tomosynthesis does not require whole-angle image-capturing, this the imaging time can be greatly reduced. Also, radiation doses taken by the involved personals in this novel tomosynthesis are proved to be less than those in the conventional CT.

Generally, image reconstruction techniques can be classified into direct methods and iterative methods. In the past, various direct methods have been vastly used to reconstruct rapidly the images, definitely by sacrificing the resolutions. For example, in the GE Discovery XR656, a digital CT, the volume-RAD MITS (Magnetic imaging technology scan) developed by Duke University is applied; and, in the Shimadzu SONIALVISION safire series, the universal x-ray imaging device applies the conventional shift-and-add technique or the FBP technique. Recently, some iterative methods such as the ART, MLEM and son on, are also applied to the tomosynthesis.

Typically, in an iterative method, provided that a vector $P(M \times 1)$ is defined to be the received signal stored in the computer in a discrete array manner, its dimension would be the product of the sensor number and the film number. A mathematical model for image reconstruction of the tomosynthesis can be formulated discretely as $GF=p$, in which the $G(M \times N)$ stands for a system array and the $F(N \times 1)$ stands for the desired 3D image. Since photos travel linearly in the space, and provided that the signal in the imaging device is emitted by a light source with a specific volume and received by a specific sensor, then, without considering light scattering and other physical factors, the G can be simplified to be a matrix formulating geometric relationship. The entry $g_{ij}$ of matrix G stands for the geometric detecting effect of the i-th voxel with respect to the j-th sensor. To different sensors at different positions, the signal-receiving outcomes would be different. These signal-receiving outcomes shall be fed back to the reconstruction computation so as to modify the spatial distribution.

Generally, the imaging theory of the tomosynthesis and that of the CT are similar. However, sampling in a tomosynthesis procession is limited to a specific angular range, from which incomplete G and P information would be inevitable. Further, the cutting direction for reconstructing images of this tomosynthesis is different to that of CT. Thereupon, artifacts that might affect the following image reading would be formed during the image-reconstruction process. For example, a ripple artifact would be caused by an insufficient scanning density, a ghost artifact would be caused by an irrelevant scanning direction, and a metallic artifact would be caused from scanning an object with a metallic matter. Unlike the 360-degree whole-angle CT that can provide sufficient scanning samples, in order to lower the radiological dose by cutting down the scanning or projection samples, truncation errors during the image reconstruction would be quite possible to occur at the boundary of the sensor. Namely, a small sampling frequency would lead to the phenomenon of boundary artifacts on the resulted 3D image. If any artifact falls at the major part to be investigated (for example, a shoulder blade in a chest scan), then the clinical diagnosis thereupon would be substantially affected.

Hence, the issue how to reduce the occurrence of the boundary artifacts on the tomosynthesis is definitely crucial in the art.

SUMMARY

Accordingly, it is the primary object of the present invention to provide a reduction method for a boundary artifact on the tomosynthesis, which can improve significantly the phenomenon of boundary artifacts, caused by insufficient scanning samples, by adjusting the geometric factor matrix during the image reconstruction.

In the present invention, the reduction method for a boundary artifact on the tomosynthesis includes: a step of performing a projection process, a step of performing a back projection process upon the geometric factor matrix so as to obtain a back-projection geometric factor matrix, and a step of adjusting a boundary area of the back-projection geometric factor matrix. The step of performing a projection process further includes: a step of a light source generating a radiation field within a limited angular range to a detection module, the radiation field projecting light beams at different predetermined angles onto the detection module so as to obtain corresponding projection data at different directions, the detection module having a plurality of sensors arranged in an array pattern, a sub radiation field being defined to be a localized radiation field between one said sensor and the light source; a step of forming a 3D spatial array by accumulating the projection data at the different directions so as to stack a spatial array having a plurality of spatial elements, the 3D spatial array including a first dimensional array, a second dimensional array and a third dimensional array; a step of obtaining a plurality of sub geometric factors, each of said sub geometric factors being obtained by carrying out a calculation upon each said spatial element of the sub radiation field with respect to each said sensor; and, a step of forming a geometric factor matrix by stacking the plurality of sub geometric factors with respect to the corresponding spatial elements.

In one embodiment of the present invention, the step of adjusting the boundary area of the back-projection geometric factor matrix includes: a step of selecting the first dimensional array and the second dimensional array of the 3D spatial array in the back-projection geometric factor matrix, a step of generating a back-projection geometric factor functional variable by each said sensor with respect to each of the first dimensional array and the second dimensional array, and a step of adjusting a boundary position of the back-projection geometric factor functional variable.

In one embodiment of the present invention, the boundary position of the back-projection geometric factor functional variable is adjusted by interpolation.

In one embodiment of the present invention, the boundary position of the back-projection geometric factor functional variable is adjusted by a modification factor.

In one embodiment of the present invention, the step of adjusting the boundary area of the back-projection geometric factor matrix includes: a step of performing a normalization process so as to obtain a normalized geometric factor matrix, the normalized geometric factor matrix being a product of the back-projection geometric factor matrix and a homogenized parameter; and, a step of adjusting a boundary area of the normalized geometric factor matrix.

In one embodiment of the present invention, the step of adjusting the boundary area of the normalized geometric factor matrix includes: a step of selecting the first dimensional array and the second dimensional array of the 3D spatial array in the normalized geometric factor matrix, a step if generating a normalized geometric factor functional variable by each said sensor with respect to each of the first dimensional array and the second dimensional array, and a step of adjusting a boundary position of the normalized geometric factor functional variable.

In one embodiment of the present invention, the boundary position of the normalized geometric factor functional variable is obtained by interpolation.

In one embodiment of the present invention, the boundary position of the normalized geometric factor functional variable is adjusted by a modification factor.

In one embodiment of the present invention, the detection module is a detection module of a digital x-ray tomosynthesis.

As stated above, in the reduction method for a boundary artifact on the tomosynthesis of the present invention, the geometric factor matrix during the image reconstruction is adjusted so that truncation errors resulted from fewer angular imaging operations during the image reconstruction can be substantially reduced. Thereupon, the phenomenon of boundary artifacts caused by less angular imaging on the conventional tomosynthesis can be greatly improved.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
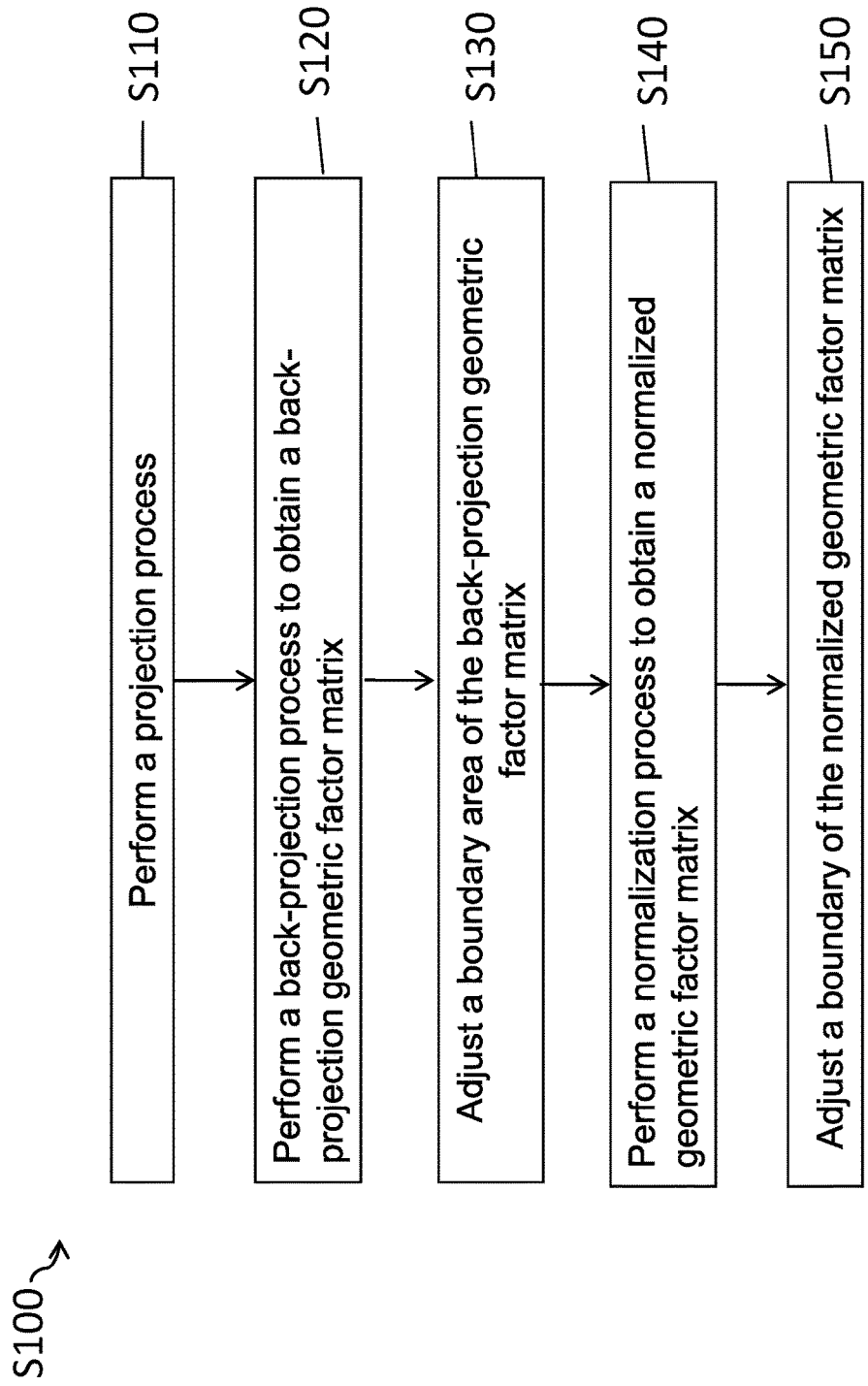
FIG. 1 is a flowchart of the preferred reduction method for a boundary artifact on the tomosynthesis in accordance with the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the present invention, a reduction method for a boundary artifact on the tomosynthesis is applied to iterative computations for image reconstruction on the digital x-ray tomosynthesis.

Figure 2:
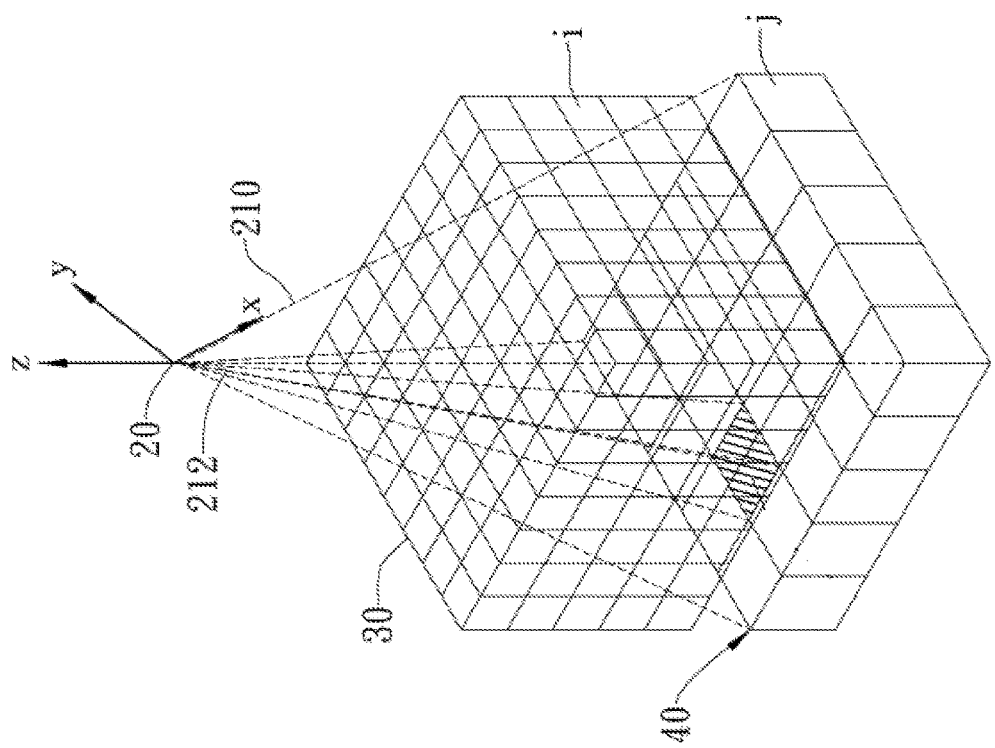
FIG. 2 demonstrates perspectively the relationship of a light source and a sensor in accordance with the present invention.
Figure 3:
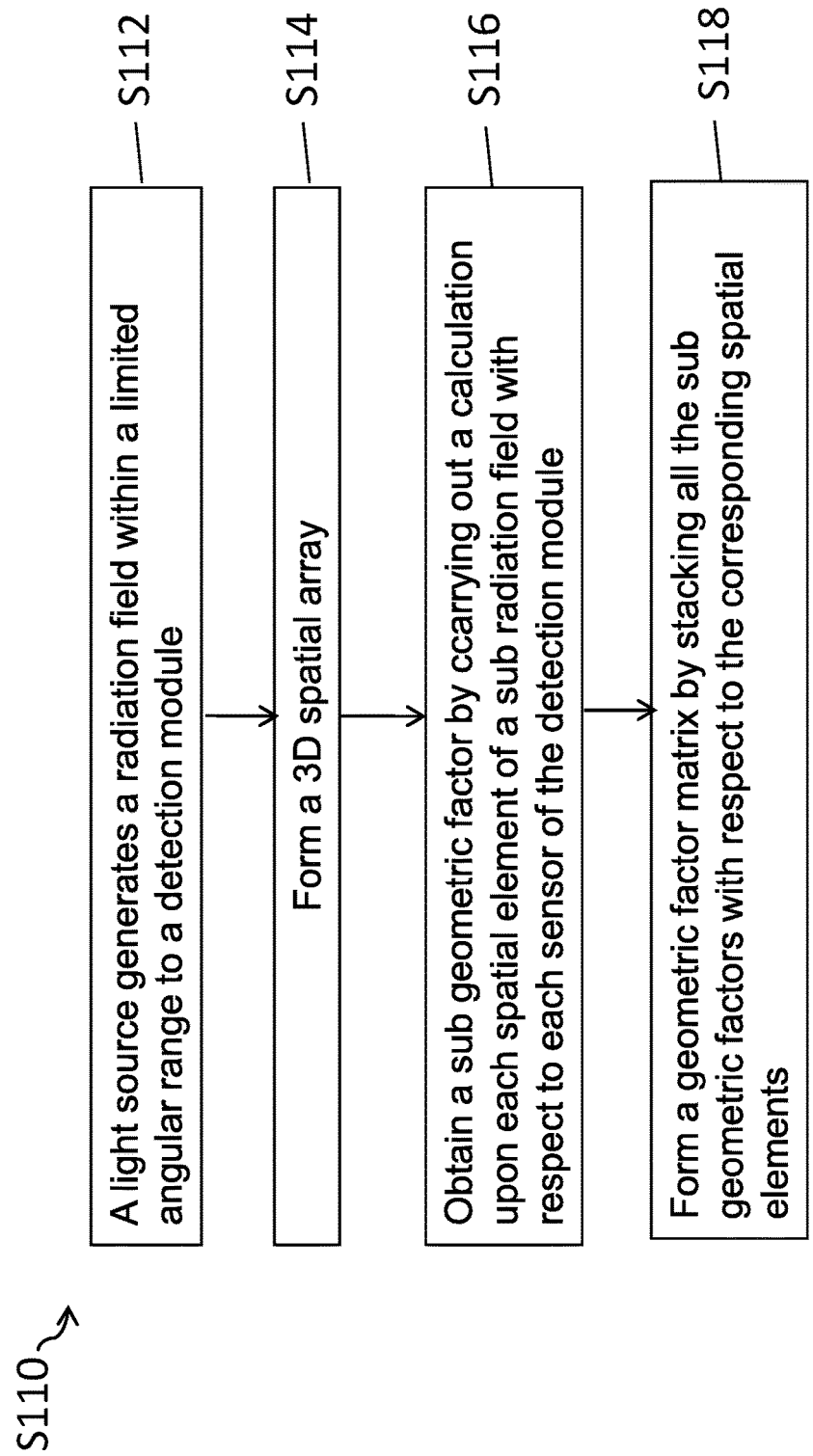
FIG. 3 is a flowchart of detailed steps to perform Step S110 of FIG. 1.

Refer now to FIG. 1, FIG. 2 and FIG. 3; where FIG. 1 is a flowchart of the preferred reduction method for a boundary artifact on the tomosynthesis in accordance with the present invention, FIG. 2 demonstrates perspectively the relationship of a light source and a sensor in accordance with the present invention, and FIG. 3 is a flowchart of detailed steps to perform Step S110 of FIG. 1.

In this embodiment, the reduction method for a boundary artifact on the tomosynthesis S100 includes Steps S110~S150 as follows.

Firstly, in Step S110, a projection process is performed. Specifically, the projection process is a forward projection calculation for iteratively reconstructing a desired image. Referring to FIG. 2 and FIG. 3, the projection process includes the following Steps S112~S118.

In performing Step S112, a light source 20 generates a radiation field 210 within a limited angular range to a detection module 40.

As shown in FIG. 2, in this 3D space, the light source 20 generates the radiation field 210 within the predetermined limited angular range, and the radiation field 210 is to project light beams at different predetermined angles onto the detection module 40 so as to obtain corresponding projection data at different directions. The detection module 40 has a plurality of sensors (j) arranged in an array pattern. A sub radiation field 212 is defined to be a localized radiation field between a sensor of the detection module 40 and the light source 20. Namely, the sub radiation field 212 is a part of the radiation field 210.

In this embodiment, the light source 20 can be an x-ray source, and the detection module 40 is applied to detect the x-ray emitted by the light source 20. Practically, the light source of the present invention is not limited to the aforesaid arrangement, and can be determined according to practical requirements. In addition, the detection module 40 of this embodiment is a detection module of a digital x-ray tomosynthesis.

Then, in performing Step S114, the aforesaid projection data are accumulated to form a 3D spatial array 30.

Specifically, as shown in FIG. 2, the 3D spatial array 30 can be realized to be located between the light source 20 and the detection module 40. Namely, the 3D spatial array 30 is structurally formed by stacking a plurality of spatial elements i. In addition, with respect to the light source 20 and the plurality of the arrayed sensors j, a 3D space is spanned by a first axis x, a second axis y and a third axis z. Further, the 3D spatial array 30 includes a first dimensional array, a second dimensional array and a third dimensional array, in which the first dimensional array is defined to be the sub array of the 3D spatial array 30 in the first x-axial direction, the second dimensional array is defined to be the sub array of the 3D spatial array 30 in the second y-axial direction, and the third dimensional array is defined to be the sub array of the 3D spatial array 30 in the third z-axial direction. In addition, it shall be noted that the location of the aforesaid light source 20 is not definitely limited to the foregoing setup. In particular, in this embodiment, the light source 20 is defined to be the origin of the 3D space, such that related calculation complexity can be reduced.

Then, in performing Step S116, a sub geometric factor gij can be obtained by carrying out a calculation upon each spatial element i of the sub radiation field 212 with respect to each sensor j.

Then, in performing Step S118, after all necessary calculation in Step S116, all the calculated sub geometric factors gij are stacked to form the geometric factor matrix Gij. In this embodiment, the aforesaid projection data is obtained by iteratively calculating the geometric factor matrix Gij and the 3D spatial array 30.

Refer now back to FIG. 1, after Step S110 is finished, Step S120 is introduced to perform a back projection calculation upon the geometric factor matrix Gij so as to obtain a back-projection geometric factor matrix G1ij.

Then, in performing Step S130, a boundary area of the back-projection geometric factor G1ij is adjusted.

Figure 4:
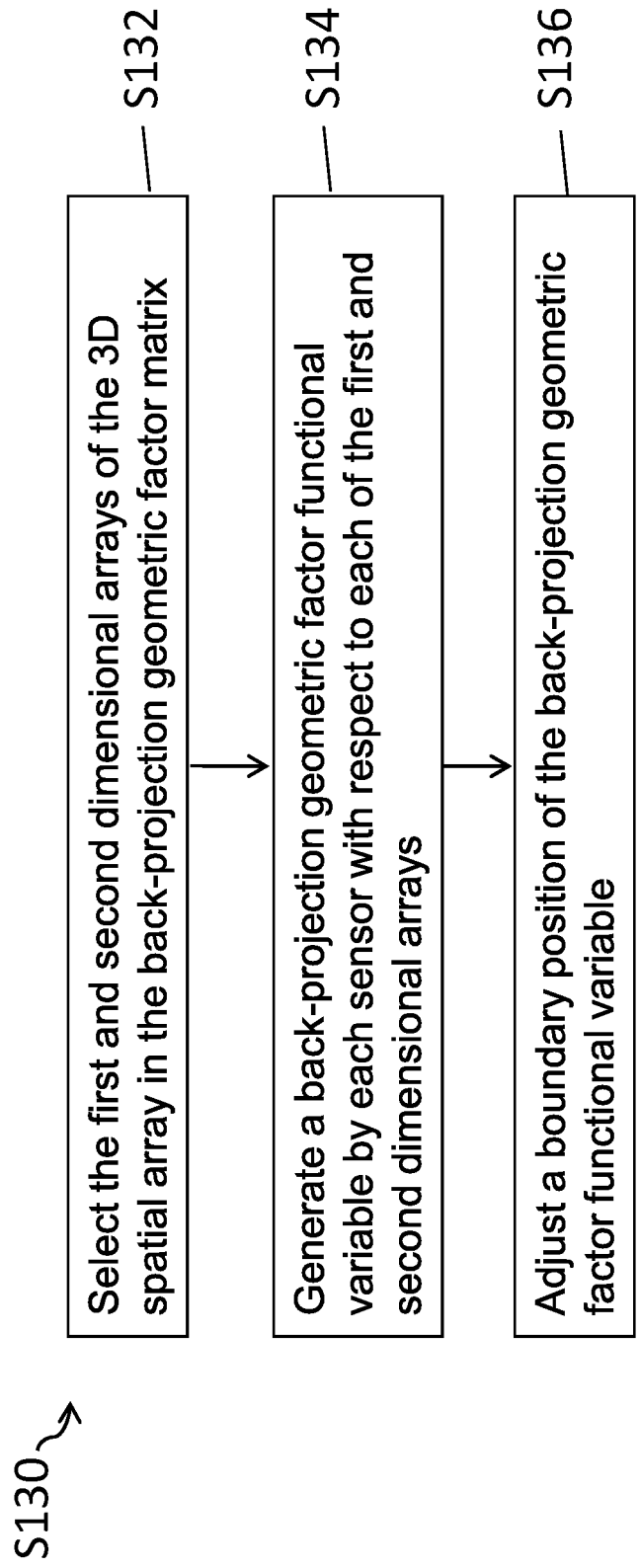
FIG. 4 is a flowchart of detailed steps to perform Step S130 of FIG. 1.
Figure 5A:
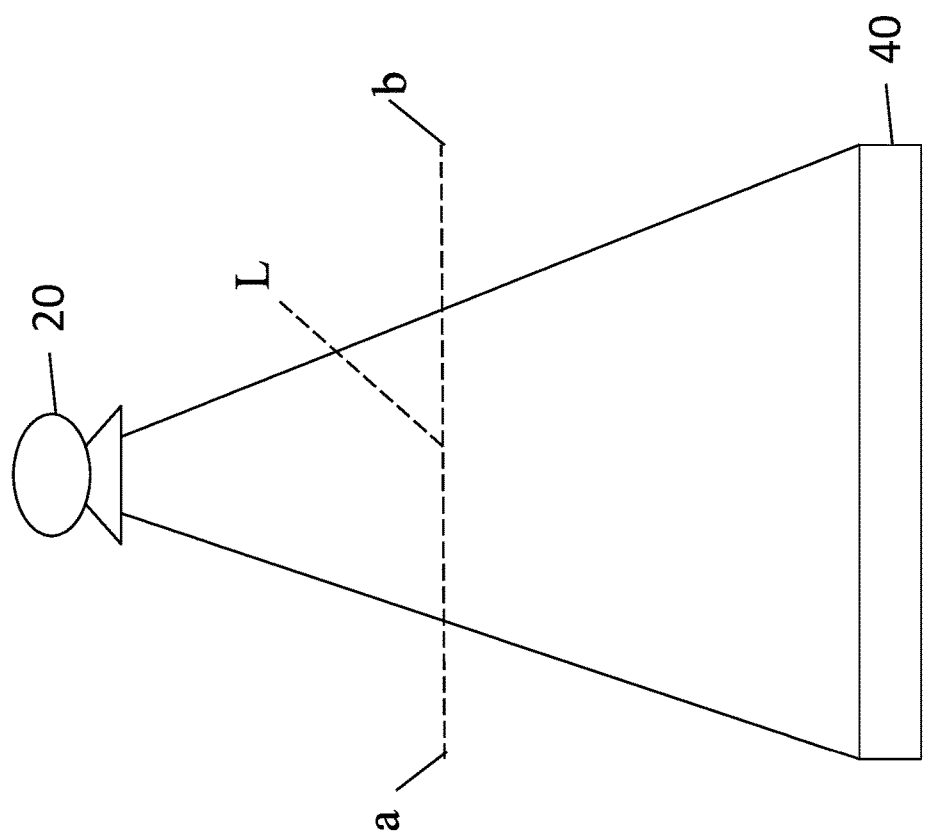
FIG. 5A demonstrates schematically the performing of Step S132 of FIG. 4.
Figure 5B:
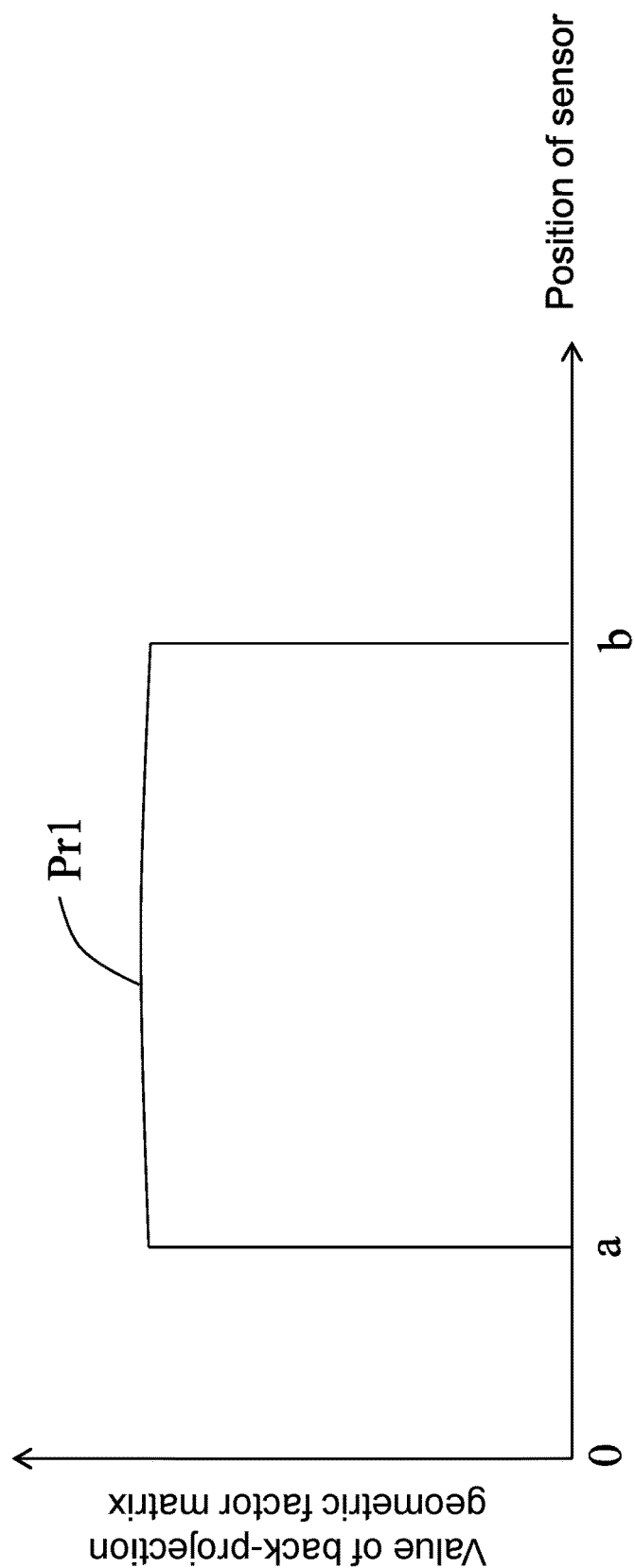
FIG. 5B is a schematic view of a captured slice of FIG. 5A.

Specifically, refer now to FIG. 4, FIG. 5A and FIG. 5B; where FIG. 4 is a flowchart of detailed steps to perform Step S130 of FIG. 1, FIG. 5A demonstrates schematically the performing of Step S132 of FIG. 4, and FIG. 5B is a schematic view of a captured slice of FIG. 5A. Firstly referred to FIG. 4 and FIG. 5A, in this embodiment, Step S130 for adjusting the boundary area of the back-projection geometric factor matrix G1ij includes the following procedures, Steps S132~S136.

In performing Step S132, the first and second directional arrays of the 3D spatial array 30 in the back-projection geometric factor matrix are G1ij are selected. Then, in performing Step S134, each sensor of the detection module 40 would generate individually a corresponding back-projection geometric factor functional variable with respect to each of the first dimensional array and the second dimensional array.

Refer now to FIG. 5A, by having the adjustment of the first dimensional array of the back-projection geometric factor matrix are G1ij as an example. While the light source 20 projects at a specific angle to generate an image and a slicing line L is captured from a specific slice in the 3D space, then the corresponding back-projection geometric functional variable for the first dimensional array with respect to the sensor j of the detection module 40 is schematically shown in FIG. 5B. In the figure, the horizontal axis is an axis of the position of the sensor, while the vertical axis is an axis of the value of the back-projection geometric factor matrix G1ij. Namely, the geometric detection effects of light beams, with respect to individual sensors j of the detection module 40, at the spatial elements i penetrated by the slicing line L of FIG. 5A are used to form correspondingly a profile Pr1 of a first back-projection geometric factor functional variable. In FIG. 5A and FIG. 5B, a first boundary point a and a second boundary point b stand for corresponding extended boundary positions of the detection module 40 at the slicing line L. Also, as shown in FIG. 5B, the profile Pr1 of the first back-projection geometric factor functional variable shows discontinuously at the first boundary point a and the second boundary point b.

Then, in performing Step S136, the boundary positions of the back-projection geometric factor functional variable are adjusted.

Figure 6A:
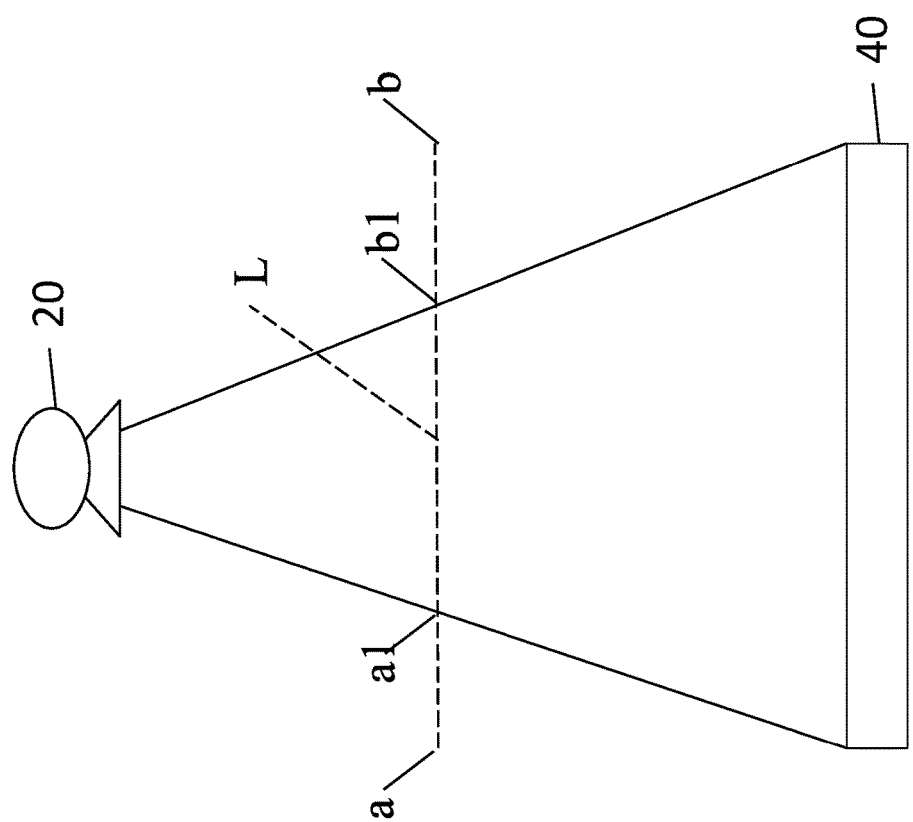
FIG. 6A demonstrates schematically the performing of Step S136 of FIG. 4.
Figure 6B:
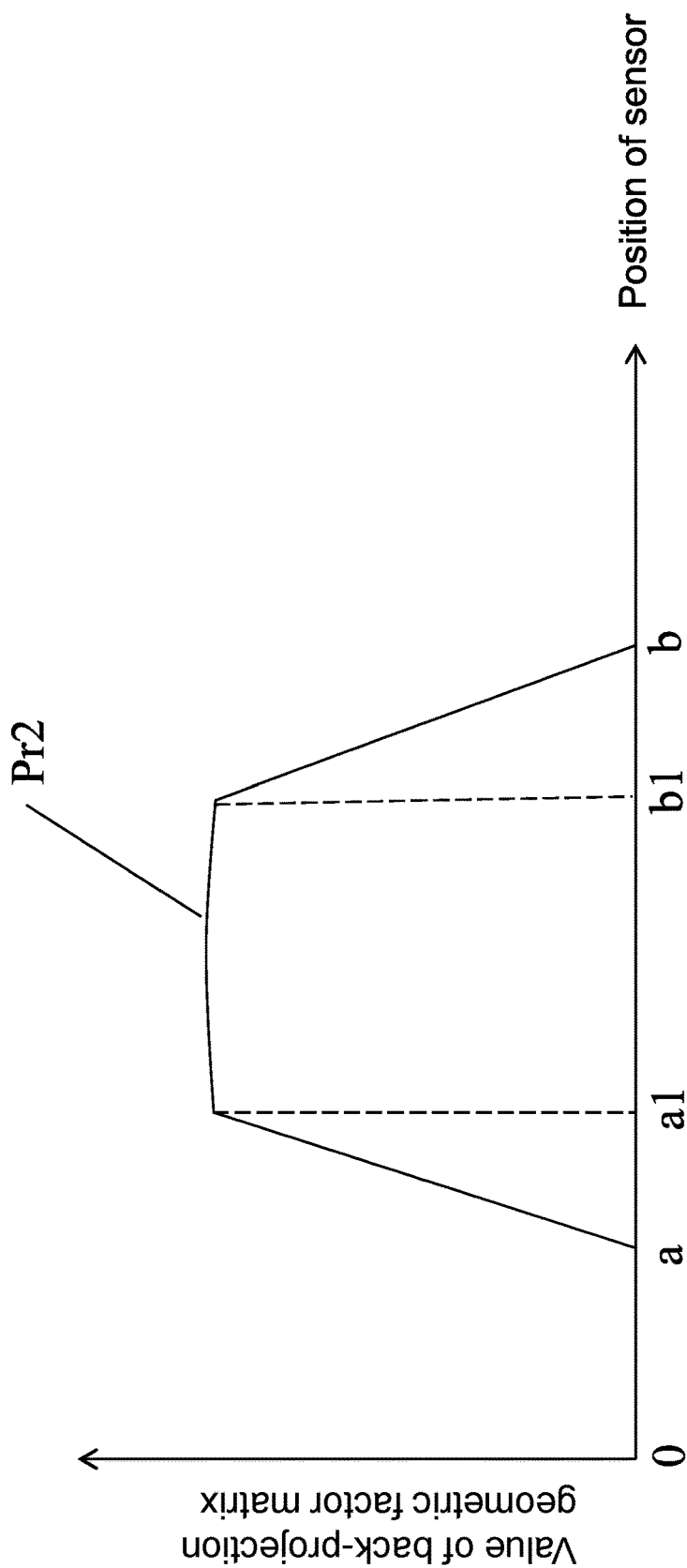
FIG. 6B is a schematic view of a captured slice of FIG. 6A.

Specifically, refer now to FIG. 6A and FIG. 6B; where FIG. 6A demonstrates schematically the performing of Step S136 of FIG. 4, and FIG. 6B is a schematic view of a captured slice of FIG. 6A. In order to smoothen the profile boundary, the first boundary point a and the second boundary point b of the slicing line L of FIG. 6A are pulled inside to a first amended boundary point a1 and a second amended boundary point b1, respectively, such that a corresponding profile Pr2 of a second back-projection geometric factor functional variable can be formed. By adjusting the boundary area of the back-projection geometric factor matrix G1ij, the back-projection geometric factor matrix G1ij in the calculation of the back projection can present a continuous distribution. It shall be noted that determination of positions of the aforesaid first amended boundary point a1 and the second amended boundary point b1 is related to the image-sampling angle, and the boundary area to be adjusted is varied according to both the image-sampling angle and the position of the profile Pr1 of the first back-projection geometric factor functional variable. Generally speaking, the position of the first amended boundary point a1 is the boundary of the image-sampling angle for the next imaging. In this embodiment, as shown in FIG. 6A, the positions of the aforesaid first amended boundary point a1 and the second amended boundary point b1 are located at the projection boundary of the light beams from the light source 20, with respect to the first boundary point a and the second boundary point b, respectively.

Figure 7:
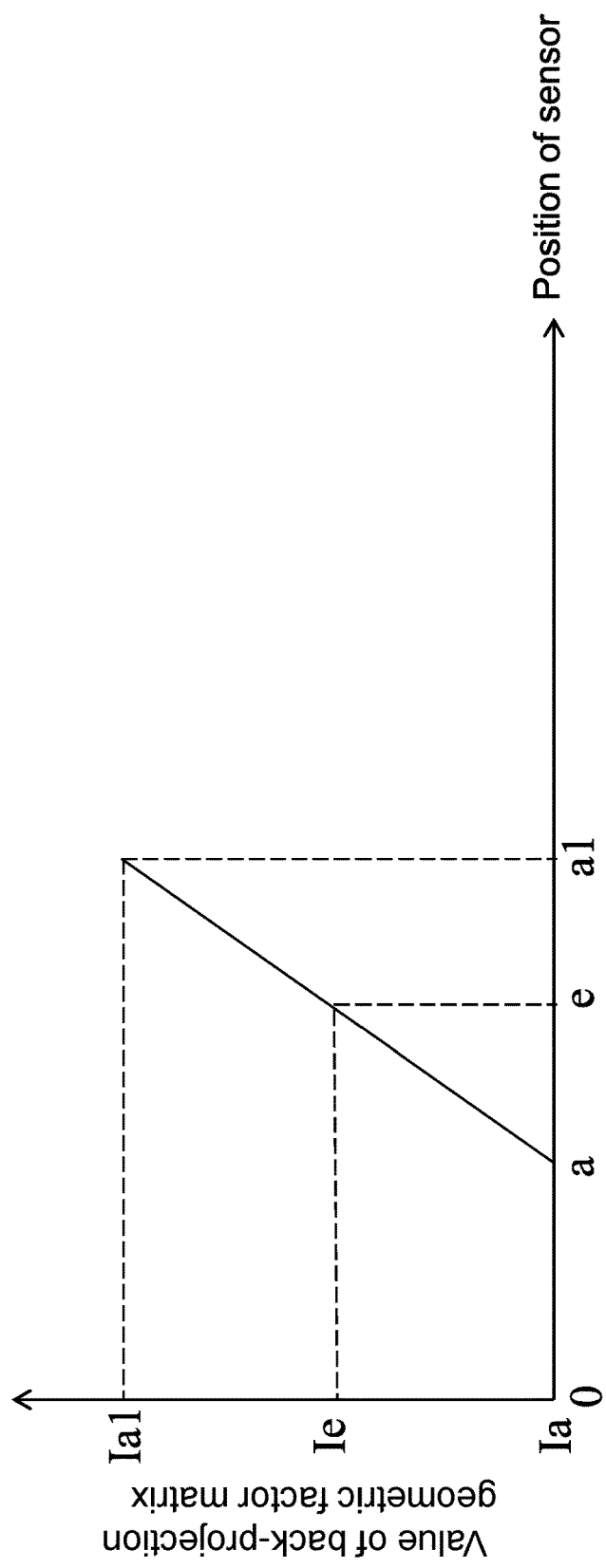
FIG. 7 is a schematic enlarged view of a portion of FIG. 6B.

In Step S136 of this embodiment, the amended boundary positions of the back-projection geometric factor functional variable is obtained by interpolation. Namely, the back-projection factor is adjusted between the first amended boundary point a1 and the boundary point a by interpolation, so as to smoothen the boundary profile. Though the linear interpolation is preferred in this embodiment, yet other algorithms can also be applied to perform the aforesaid calculation. While in calculating the back-projection geometric factors, positions of boundary light beams of the projection at different angling can be obtained, and so as those the boundary light beams at different slices. Specifically, refer now to FIG. 7, where a schematic enlarged view of a portion of FIG. 6B is demonstrated. As shown, a first middle point e is located at a center of the boundary light beam at the slice. Coordinates of the first boundary point a, the amended first boundary point a1 and the first middle point e can be obtained by evaluating the positions of the light source 20 and the detection module 40. The value in the back-projection geometric factor matrix with respect to position of the first boundary point a is Ia, the value in the back-projection geometric factor matrix with respect to the position of the first amended boundary point a1 is Ia1, and the value in the back-projection geometric factor matrix with respect to the position of the first middle point e is Ie. Thereupon, the Ie can be obtained by calculating the following mathematical equation (1) for modification factors:

$$Ie = \frac{Ia1 - Ia}{\|a1 - a\|} \|e - a\| + Ia; \qquad (1)$$

A relative distance can be obtained by plugging the positions of the first boundary point a, the first amended boundary point a1 and the first middle point e into the mathematical equation (1) for modification factors. Further, the Ie can be obtained by performing interpolation. Similarly, the process to adjust the boundary position of the back-projection geometric factor functional variable can use the aforesaid modification factor to modify the back-projection geometric factor functional variable, so as further to calculate the amended geometric factor of the spatial element i between the first boundary point a and the first amended boundary point al, with respect to a specific angular projection and a specific slice.

Referring back to FIG. 1, after Step S130 is finished, the back projection calculation would focus at adjusting the boundary area of the back-projection geometric factor matrix, such that the boundary can be elegantly smoothened, and also the phenomenon of boundary artifacts caused by insufficient angular imaging can be improved.

Referring now back to FIG. 1, after Step S130 is finished, then Step S140 is performed to carry out a normalization calculation, song as to obtain a normalized geometric factor matrix G2ij, where the normalized geometric factor matrix G2ij is a product of the back-projection geometric factor matrix G1ij and a homogenized parameter. The homogenized parameter can be a ratio of 1 to a number of grids, where the number of the grids is determined by the first dimensional arrays, the second dimensional arrays and the third dimensional arrays in the 3D spatial array 30. By having the first axis x for example, the number of the grids is the number of the spatial elements i in the first dimensional array.

Figure 8:
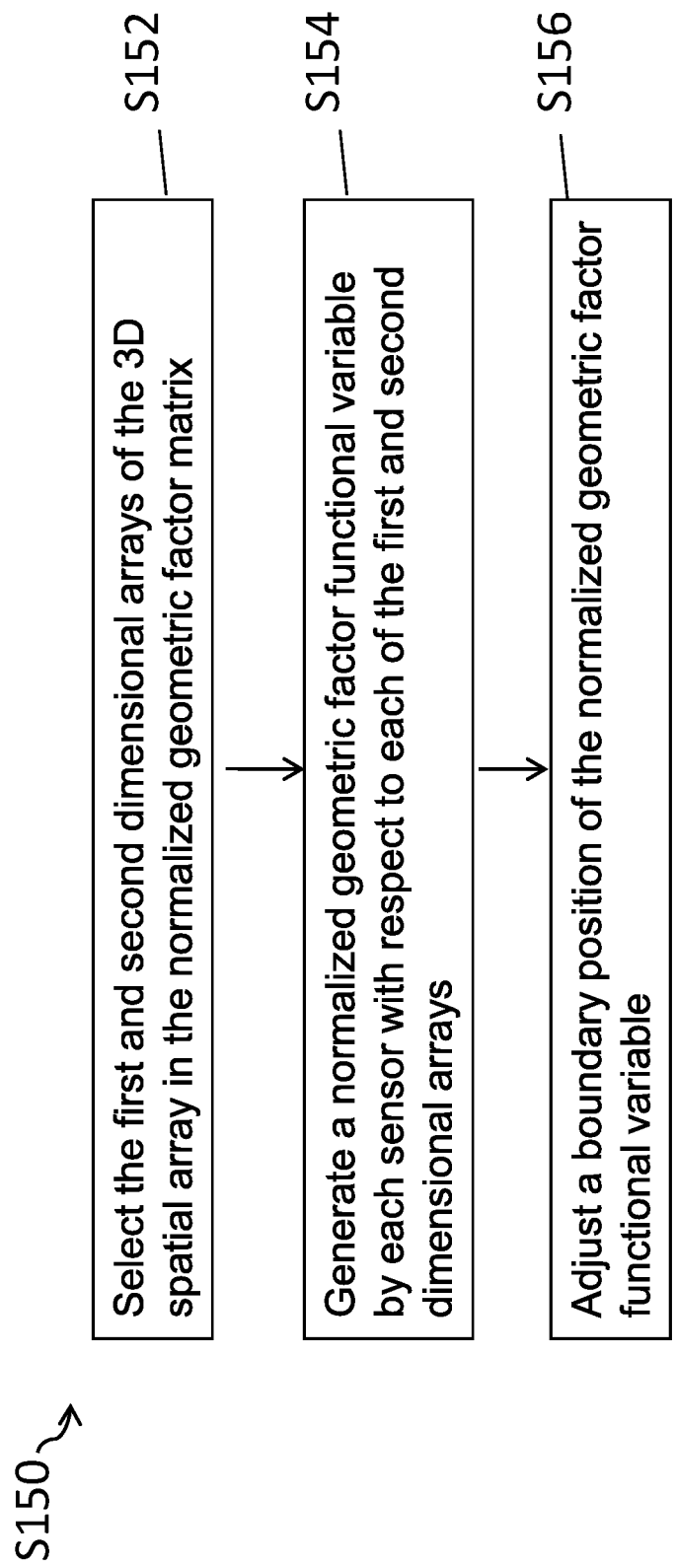
FIG. 8 is a flowchart of detailed steps to perform Step S150 of FIG. 1.

After the normalization step issue finished, then Step S150 is performed to adjust the boundary area of the normalized geometric factor matrix G2ij. Specifically, refer now to FIG. 8, where a flowchart of detailed steps to perform Step S150 of FIG. 1 is present. In this embodiment, Step S150 for adjusting the boundary area of the normalized geometric factor matrix G2ij includes the following Steps S152~S156. Firstly, in performing Step S152, the first dimensional array and the second dimensional array of the 3D spatial array in the normalized geometric factor matrix G2ij is selected. Then, in performing Step S154, each sensor of the detection module 40 generates a corresponding normalized geometric factor functional variable with respect to each of the first dimensional array and the second dimensional array. Then, in performing Step S156, the boundary position of the normalized geometric factor functional variable is modified, where the adjustment upon the boundary position of the normalized geometric factor functional variable is obtained by performing interpolation. Namely, in Steps S152~S156, the calculation herein is similar to that of the foregoing Steps S132~S136 for adjusting the boundary area of the back-projection geometric factor matrix. Hence, the adjustment upon the boundary position of the normalized geometric factor functional variable can be referred to the aforesaid adjustment that introduces the modification factor to adjust the normalized geometric factor functional variable. Also, a relevant calculation for a modification factor herein can refer to the foregoing mathematical equation (1).

Figure 9A:
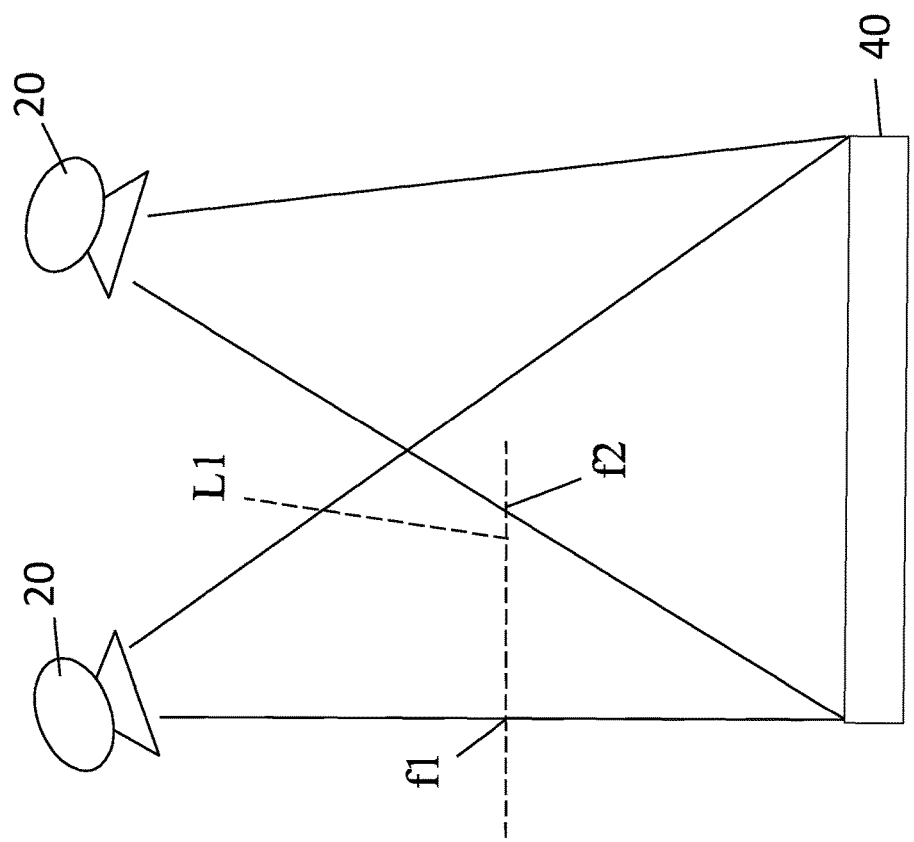
FIG. 9A demonstrates schematically projections by different angles.
Figure 9B:
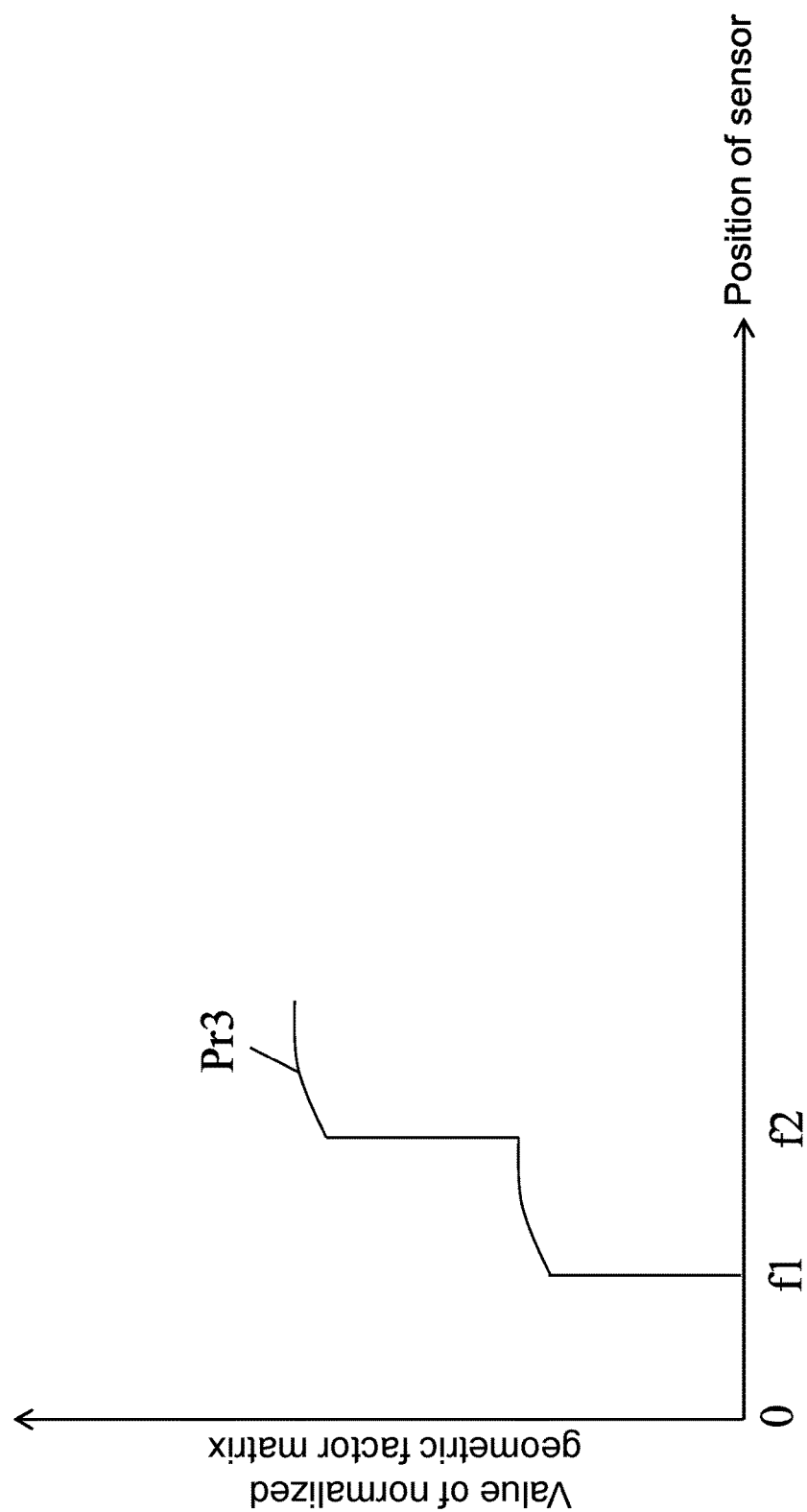
FIG. 9B is a schematic view of a captured slice of FIG. 9A.
Figure 9C:
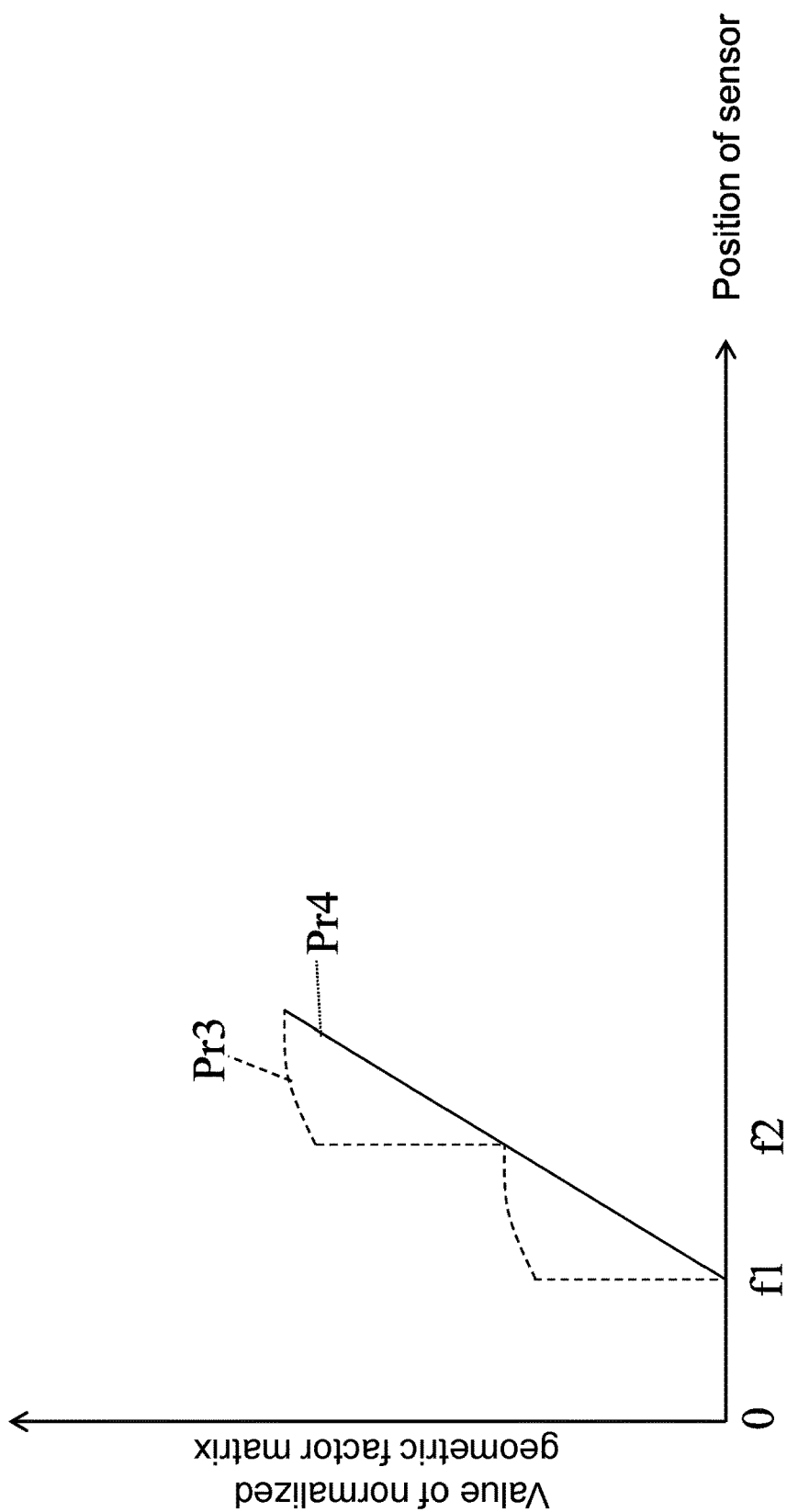
FIG. 9C is a schematic view of the captured slice of FIG. 9B after normalized geometric factors have been adjusted in accordance with the present invention.

Refer now to FIG. 9A through FIG. 9C; where FIG. 9A demonstrates schematically projections by different angles, FIG. 9B is a schematic view of a captured slice of FIG. 9A, and FIG. 9C is a schematic view of the captured slice of FIG. 9B after normalized geometric factors have been adjusted in accordance with the present invention. As shown in FIG. 9A, after the imaging in one direction by the light source 20 is complete, then the light source 20 would proceed to perform another imaging in another direction. At this time, a slicing line L1 is captured from a specific slice in the 3D space. Thereupon, a boundary f1 and another boundary f2 can be obtained from the two foregoing imaging by the light source 20 in two different directions. In this instance, apparently, the number of angular imaging is insufficient. Therefore, if Step S150 is not performed to adjust the normalized geometric factor matrix G2ij, part of the profile Pr3 of the normalized geometric factor functional variable would be that shown in FIG. 9B. Obviously, in FIG. 9B, position integration of the boundaries f1 and f2 demonstrates a discontinuous state.

Hence, as shown in FIG. 9C, where Step S150 for adjusting the profile Pr3 of the normalized geometric factor functional variable is performed. Apparently, after Step S150 is performed, the modified profile Pr4 (in solid line) of the normalized geometric factor functional variable demonstrates to be in a continuous state, by compared to the discontinuous profile Pr3 (in dashed line) of the unadjusted normalized geometric factor functional variable. Thus, by performing Step S150, the normalized geometric factor matrix G2ij in the normalization step can present a continuous distribution.

In summary, the reduction method for a boundary artifact on the tomosynthesis provided in the present invention is applicable to the iterative imaging algorithms, and also applicable to the digital x-rage tomosynthesis system that provides a fewer number of angular images.

Further, in the reduction method for a boundary artifact on the tomosynthesis of the present invention, the geometric factor matrix during the image reconstruction is adjusted so that truncation errors resulted from fewer angular imaging operations during the image reconstruction can be substantially reduced. Namely, by applying the reduction method for a boundary artifact on the tomosynthesis In accordance with the present invention, even less angular imaging is performed, but the imaging quality can still be maintained. Thereupon, without sacrificing the imaging quality, the patients to undergo the tomosynthesis can suffer less radiation exposure, and thus can substantially reduce the radiation dose taken in an imaging operation.

In addition, in the iterative image reconstruction, the adjustment is performed upon the geometric factor matrix with respect to the back projection calculation and the normalization step, so as to smoothen the boundary area in the back projection calculation and the normalization calculation. Also, thereby, the variation of the geometric factor in the boundary area can be reduced, such that the entire image can demonstrate continuous profile. Thus, the conventional boundary artifacts caused by fewer angular imaging data for reconstruction can be significantly reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A reduction method for a boundary artifact on the tomosynthesis, comprising the steps of:

performing a projection process, further including the steps of:

a light source generating a radiation field within a limited angular range to a detection module; wherein the radiation field projects light beams at different predetermined angles onto the detection module so as to obtain corresponding projection data at different directions, the detection module has a plurality of sensors arranged in an array pattern, a sub radiation field is defined to be a localized radiation field between one said sensor and the light source;

forming a 3D spatial array by accumulating the projection data at the different directions so as to stack a spatial array having a plurality of spatial elements, the 3D spatial array including a first dimensional array, a second dimensional array and a third dimensional array;

obtaining a plurality of sub geometric factors, each of said sub geometric factors being obtained by carrying out a calculation upon each said spatial element of the sub radiation field with respect to each said sensor; and forming a geometric factor matrix by stacking the plurality of sub geometric factors with respect to the corresponding spatial elements;

performing a back projection process upon the geometric factor matrix so as to obtain a back-projection geometric factor matrix; and adjusting a boundary area of the back-projection geometric factor matrix.

2. The reduction method for a boundary artifact on the tomosynthesis of claim 1, wherein the step of adjusting the boundary area of the back-projection geometric factor matrix includes the steps of:

selecting the first dimensional array and the second dimensional array of the 3D spatial array in the back-projection geometric factor matrix;

generating a back-projection geometric factor functional variable by each said sensor with respect to each of the first dimensional array and the second dimensional array; and adjusting a boundary position of the back-projection geometric factor functional variable.

3. The reduction method for a boundary artifact on the tomosynthesis of claim 2, wherein the boundary position of the back-projection geometric factor functional variable is adjusted by interpolation.

4. The reduction method for a boundary artifact on the tomosynthesis of claim 2, wherein the boundary position of the back-projection geometric factor functional variable is adjusted by a modification factor.

5. The reduction method for a boundary artifact on the tomosynthesis of claim 1, wherein the step of adjusting the boundary area of the back-projection geometric factor matrix includes the steps of:

performing a normalization process so as to obtain a normalized geometric factor matrix, wherein the normalized geometric factor matrix is a product of the back-projection geometric factor matrix and a homogenized parameter; and adjusting a boundary area of the normalized geometric factor matrix.

6. The reduction method for a boundary artifact on the tomosynthesis of claim 5, wherein the step of adjusting the boundary area of the normalized geometric factor matrix includes the steps of:

selecting the first dimensional array and the second dimensional array of the 3D spatial array in the normalized geometric factor matrix;

generating a normalized geometric factor functional variable by each said sensor with respect to each of the first dimensional array and the second dimensional array; and adjusting a boundary position of the normalized geometric factor functional variable.

7. The reduction method for a boundary artifact on the tomosynthesis of claim 6, wherein the boundary position of the normalized geometric factor functional variable is obtained by interpolation.

8. The reduction method for a boundary artifact on the tomosynthesis of claim 6, wherein the boundary position of the normalized geometric factor functional variable is adjusted by a modification factor.

9. The reduction method for a boundary artifact on the tomosynthesis of claim 1, wherein the detection module is a detection module of a digital x-ray tomosynthesis.

* * * * *